Aug. 7, 1934.  W. L. McGRATH  1,968,951
POWER PLANT CONTROL
Filed April 20, 1932   2 Sheets-Sheet 1

Witness:
Burr W. Jones

INVENTOR
William L. McGrath
Clinton S. Jones
BY
ATTORNEY

Aug. 7, 1934.  W. L. McGRATH  1,968,951
POWER PLANT CONTROL
Filed April 20, 1932  2 Sheets-Sheet 2
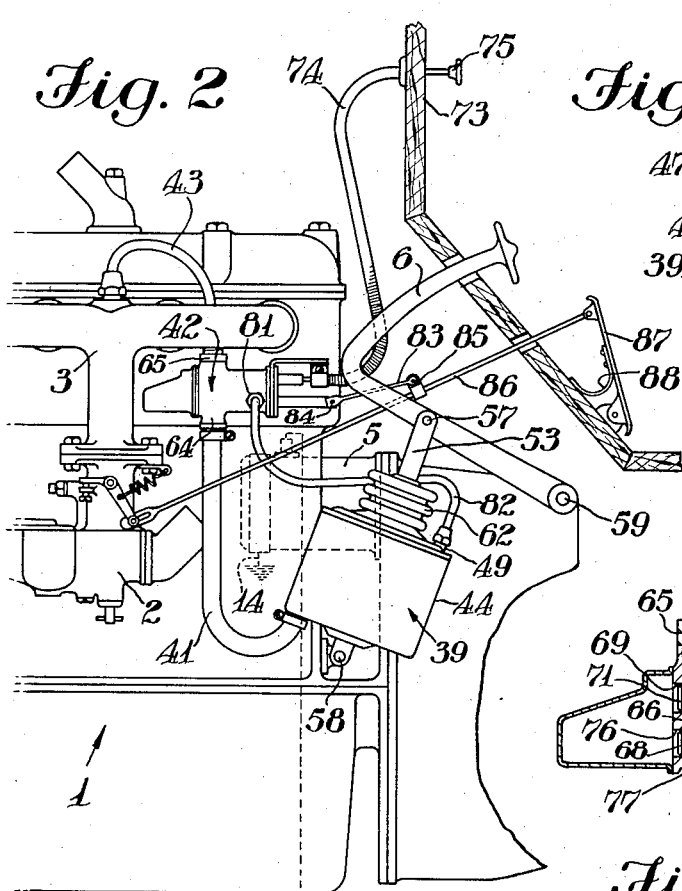
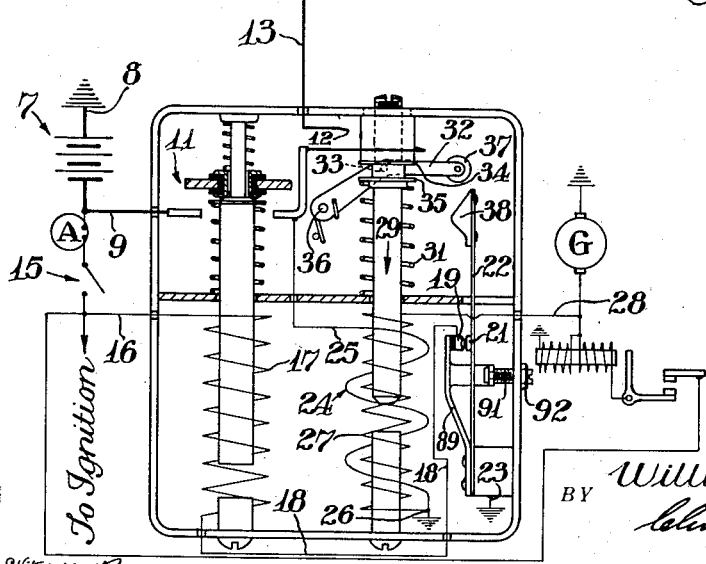
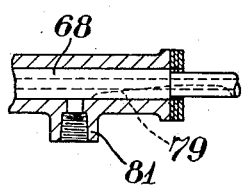
Fig. 5
INVENTOR
William L. McGrath
BY Clinton S. Janes
ATTORNEY
Witness: Burr W. Jones Patented Aug. 7, 1934.

1,968,951

UNITED STATES PATENT OFFICE 1,968,951

POWER PLANT CONTROL.

William L. McGrath, Elmira, N. Y., assignor to Eclipse Machine Company, Elmira, N. Y., a corporation of New York Application April 20, 1932, Serial No. 606,480

8 Claims. (Cl. 290—38)

This invention relates to a power plant control and more particularly to automatic starting and clutch controlling mechanism for automotive power plants.

In automotive power plant installations incorporating automatic starting mechanism and an automatic clutch control operated from the engine intake vacuum, if the engine should stall while the vehicle is "free-wheeling" by virtue of the clutch control, it is in theory substantially immaterial whether the engine be restarted by the automatic starting mechanism or by the momentum of the vehicle through the reengagement of the clutch due to the failure of the intake vacuum. It has been found in practice, however, that it is preferable under these circumstances to have the automatic starting mechanism perform its function prior to reengagement of the clutch.

Moreover, if such engine stall occurs while the vehicle is stationary and in gear, it is obviously desirable to have the automatic starting mechanism restart the engine prior to engagement of the clutch in order to avoid placing an unnecessary load on the starting motor or even causing the starting motor to move the vehicle.

It is an object of the present invention to provide a novel automotive power plant control incorporating an automatic starting mechanism and an automatic clutch control embodying provisions whereby in case of engine stall the starting mechanism will function prior to engagement of the clutch.

It is another object of the invention to provide such a device in which the automatic clutch control is so arranged as to prevent immediate reengagement of the clutch after engine stall except through manual actuation of said clutch control.

It is a further object to provide such a device in which the automatic starting mechanism is provided with means for delaying the operation thereof until the engine comes completely to rest, and the delaying means for the clutch control and for the starting mechanism are so adjusted that in case of engine stall the starting mechanism will always be operated prior to reengagement of the clutch.

Further objects and advantages will be apparent to those skilled in this art from the following description taken in connection with the accompanying drawings in which:

Fig. 2 is a side elevation of a portion of the power plant showing the controlling mechanism therefor, with the automatic starting mechanism illustrated enlarged and in semi-diagrammatic form;

Fig. 3 is an enlarged view of the clutch operating servo;

Fig. 4 is an enlarged vertical section of the control valve mechanism for the clutch servo; and Fig. 5 is a fragmentary horizontal section of said valve mechanism.

Figure 1:
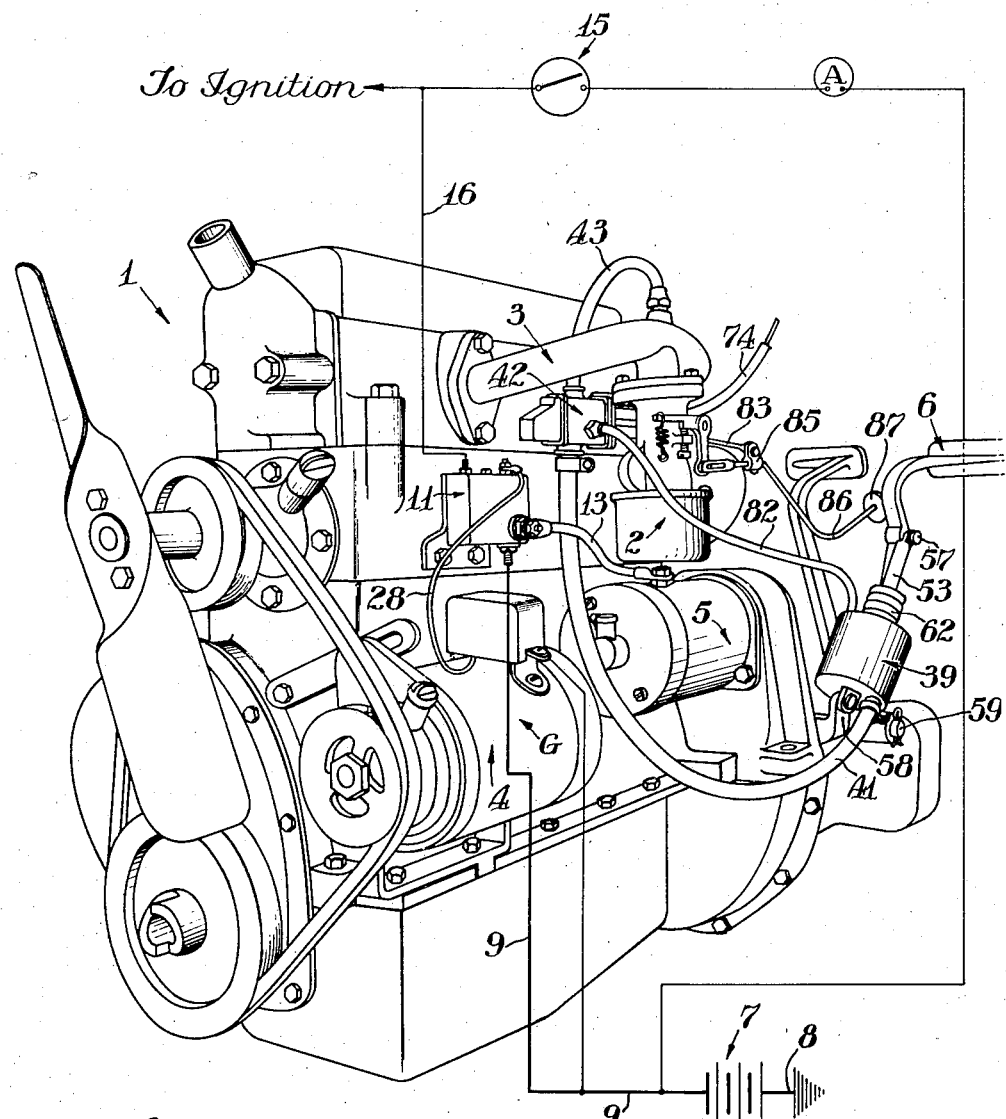
Fig. 1 is a perspective view of an automotive power plant with controlling mechanism embodying a preferred form of the invention.

Referring first to Fig. 1 of the drawings there is illustrated an internal combustion engine indicated generally by numeral 1 and having the usual component and auxiliary devices including a carburetor 2 connected to an intake manifold 3, a generator 4, a starting motor 5, and a clutch pedal 6, depression of which is arranged to disengage the load clutch, not illustrated, of the engine in the usual manner.

According to the present invention, automatic starting mechanism is provided for starting the internal combustion engine upon closure of the ignition switch thereof and for restarting the engine automatically in case of engine stall. As illustrated more particularly in Fig. 2, the starting mechanism comprises a battery 7 grounded at 8 and connected by a lead 9 to a magnetic starting switch 11. Switch 11 is connected through a single turn coil 12 and lead 13 to the starting motor 5 which is grounded as indicated at 14 to complete the starting circuit.

A control circuit for the magnetic starting switch 11 is provided comprising a manual switch 15 which is preferably the ignition switch of the internal combustion engine and which is connected through an ammeter A to the battery lead 9. Switch 15 is connected by a lead 16 to a solenoid 17 for actuating the ignition switch 11, the control circuit being completed through a lead 18, fixed contact 19 and movable contact 21 mounted on spring strip 22 which is grounded as indicated at 23 whereby closure of the manual switch 15 will energize the solenoid 17 to close the starting switch 11.

Means are provided for opening contacts 19, 21 to break the control circuit when the engine starts, and to maintain said contacts open as long as the engine is self-operative, comprising a shunt coil 24 connected at one end by a lead 25 to the motor side of the starting switch 11 and grounded at its other end as indicated at 26; and a generator coil 27 connected at one end by a lead 28 to the generator G and grounded at its opposite end at 26.

Coils 24 and 27 are arranged to attract a core 29 which is normally maintained in its upper position as illustrated by suitable means such as a spring 31, and which when attracted downwardly is arranged to operate a lever 32 by a suitable connection such as a pin 33 extending laterally from said lever and arranged to engage between a pair of flanges 34 and 35 on the end of said core. Lever 32 is pivoted at one end as at 36 and carries at its free end a roller 37 adapted to be moved by said core 29 into engagement with an inclined weight member 38 mounted on the end of the spring strip 22 and thereby bend said strip backward and move contact 21 away from the fixed contact 19 thereby breaking the control circuit. The pendulous mounting of the weight member 38 on the spring strip 22 is arranged to keep said strip vibrating for a predetermined time after the release of said weight member in order to delay effective closure of the control circuit for a time interval after the release of plunger 29.

In the operation of the automatic starting mechanism, starting with the parts in their idle positions as illustrated in Fig. 2, closure of the ignition switch 15 completes the control circuit, causing closure of the starting switch 11 and consequent cranking of the engine. At this time, the shunt coil 24 is energized but the core 29 is retained in its upper position by reason of the flux in the single turn coil 12 due to the heavy cranking current traversing said coil. When the engine starts, the release of the cranking load causes a drop in the current through the starting circuit, whereby the shunt coil 24 is enabled to overcome the series coil 12 and move the core 29 to swing the lever 32 to its lower position, thus bending back the spring strip 22 and opening contacts 19, 21. The generator G being driven from the engine, energizes the generator coil 27 to hold the core 29 in its retracted position as long as the engine is self-operative. Should the engine stall, the deenergization of the generator coil 27 allows the plunger 29 to rise and release the weight member 38. The latter vibrates as above stated for a predetermined length of time in order to allow the engine to come completely to rest, and then closes the control circuit to cause reactuation of the starting mechanism in the usual manner.

Means for automatically controlling the operation of the clutch pedal 6 by means of power derived from the intake vacuum is illustrated comprising a servo motor 39 connected by a flexible conduit 41 to a compound control valve 42 which is connected to the intake manifold 3 by means of a conduit 43. The control valve 42 is arranged to be operated manually, and as illustrated, in conjunction with the throttle control of the carburetor 2, the arrangement being such that when the carburetor throttle is closed the intake vacuum will be effective to disengage the clutch whereas when the throttle is opened, the clutch will be allowed to reengage.

Referring now more particularly to the showing in Figs. 2 and 3 of the drawings the servo motor 39 is illustrated as comprising a cylinder 44 closed at its lower end by a head 45 having a nipple 46 for attachment of the conduit 41, and closed at the other end by a removable head 47 provided with an inwardly opening check valve 48 and a bleeder opening 49. A piston 51 is arranged to have a sliding fit within the cylinder 44 and is provided with suitable obturating means 52. Piston rod 53 is suitably fixed to the piston 51 and projects from the cylinder 44 through a guide bearing 54 in the head 47, which bearing is provided with suitable packing means 55 and 56. The upper end of the piston rod 53 is pivotally attached in any suitable way to the clutch pedal 6 as indicated at 57, and the lower cylinder head 45 is pivoted to a fixed support as indicated at 58 whereby motion of the piston 51 within the cylinder 44 causes the clutch pedal 6 to swing about its pivot 59. It will be understood that the piston rod 53 may not be pivoted directly on the clutch pedal 6 but may if desired be connected to a clutch operating element separate from the pedal and arranged to be operated either by the pedal 6 or by the servo motor 39 so that the clutch pedal 6 will not partake of the automatic movement of the clutch operating element.

It will be understood that in the operation of the servo motor 39, exhaustion of the space below the piston 51 by aspiration through the nipple 46 will cause atmospheric pressure to enter through the check valve 48 and move the piston 51 toward the bottom of the cylinder 44 thus swinging the clutch pedal 6 to disengage the clutch; while release of the vacuum below the piston 51 will allow the piston to rise under the action of the usual clutch spring, not illustrated, the air trapped above the piston escaping through the bleeder opening 49. In order to accelerate the initial upward movement of the piston, a groove 61 may be provided in the piston rod 53 which allows escape of the air within the upper end of the cylinder until said groove is cut off by the packing means 55. A flexible sheath 62 is preferably provided for protecting the bearing portion of the piston rod.

The control valve 42 for the servo motor is illustrated in detail in Figs. 4 and 5, and comprises a body portion 63 adapted to be fixed on a suitable support and provided with nipples 64 and 65 adapted to receive the conduits 41 and 43, and having a passage 66 connecting said nipples. A pair of piston valves 67 and 68 are arranged to control the passage 66 and connect the same either with the intake vacuum by means of the conduit 43 or with the outside atmosphere. For this purpose piston valve 67 is slidably fitted in a transverse cylindrical bore 69 and is provided with an intermediate reduced portion 71 and a longitudinal groove 72. It will be understood that when the valve 67 is moved to position the reduced portion 71 in registry with the passage 66 that said passage will be opened to the intake conduit 43, whereas when said valve is moved to the left in Fig. 4 until the groove 72 comes into registry with the passage 66, the latter will be cut off from the intake vacuum and connected to the outside atmosphere. Valve 67 is arranged to be manually operated from the dash 73 of the vehicle by suitable means such as a Bowden wire 74 connected to a button 75, this valve being used to render the servo motor 39 operative or inoperative at the volition of the operator. Piston valve 68 is similarly fitted in a bore 76 in the valve body 63 parallel to the bore 69, and is provided with a reduced portion 77 and a longitudinal groove 78 similar to and functioning in the same manner as the corresponding parts of the valve 67. The groove 78, however, is longer than the groove 72 in valve 67 in order to provide for a longer travel of the valve 68. A second longitudinal groove 79 is provided in the piston valve 68 arranged approximately at 90° from groove 78 and in position to be brought into registry with a lateral opening 81 in the valve body 63 at approximately the same time that the groove 78 is brought into registry with the passage 66. Groove 79 is tapered as illustrated and extends outside the body of the valve 63 whereby the opening 81 is gradually vented to the atmosphere as the piston 68 is moved to the left in Figs. 4 and 5. The opening 81 is connected by a flexible conduit 82 to the bleeder opening 49 in the cylinder 44 whereby the valve 68 is enabled to control the venting of the upper portion of said cylinder.

The valve 68 is arranged to be operated in conjunction with the throttle of the carburetor 2 by suitable means which as illustrated in Fig. 2 takes the form of a link 83 pivoted to said valve as indicated at 84 and pivotally clamped as indicated at 85 to a throttle actuating rod 86. The rod 86 is arranged to be actuated by an accelerator pedal 87 pivoted to the floor board of the vehicle in the usual manner and maintained in its upper position with the throttle closed and the valve 68 in its open position as illustrated in Fig. 4, by suitable means such as a spring 88.

During self-operation of the engine, assuming that the master valve 67 is in its operative position, when the accelerator pedal 87 is in its normal or idling position, the control valve 68 is open as shown in Fig. 4, and connects the servo motor 39 with the intake vacuum, causing the piston 51 to be retracted to its lower position as illustrated in Fig. 3, thus disengaging the engine clutch. Pressure on the accelerator 87 to open the engine throttle moves the control valve 68 to cut off the vacuum from the servo motor 39 and thereafter to vent the lower end of the cylinder 44 to the atmosphere through the channel 78. The piston 51 thereupon immediately rises, the trapped air in the space above said piston being vented through the channel 61 until said channel is cut off by the packing 55, whereupon the further upward motion of piston 51 depends upon the degree of opening of the bleeder connection controlled by the inclined channel 79 in the control valve 68. As above pointed out, this bleeder connection varies with the position of the accelerator pedal 87, whereby a sudden wide opening of the engine throttle by the accelerator will allow rapid engagement of the engine clutch while a slow opening of the throttle effects a corresponding gradual engagement of the engine clutch.

It will be understood that the position of the piston rod 53 when the movement thereof is arrested by closure of slot 61 corresponds to initial light engagement of the load clutch elements, and the delay in completely closing the engine clutch due to the above described control of the bleeder connection can be varied within wide limits by suitable positioning and conformation of the inclined slot 79 whereby the most satisfactory operation of the controlling mechanism can be secured.

According to the present invention, the time delay of the clutch control mechanism is so coordinated with the time delay of the automatic starting mechanism that in case of engine stall, the starting mechanism will operate before the engagement of the clutch. The time delay of the automatic starting mechanism is also made adjustable, the adjusting means being here shown as comprising a flexible bracket 89 for supporting the fixed contact 19, and adjusting means for moving said bracket to vary the normal pressure of the contact 19 against the contact 21 in the form of an adjusting screw 91 with a lock nut 92 thereon for retaining the parts in adjustment.

In order to further ensure the proper sequence of operation of the component parts of the control mechanism, according to the present invention supplemental means are provided to prevent the immediate release of the piston 51 upon dissipation of the intake vacuum caused by the stoppage of the engine. As here shown this means is in the form of a check valve 93 mounted in the valve body 63 at the upper end of passage 66 and arranged to prevent the passage of gas from the intake manifold back into said passage. It will thus be seen that in case of engine stall, the control valve 68 being in its open position as illustrated, the check valve will prevent the dissipation of the vacuum below the piston 51 whereby the clutch will be maintained disengaged until the automatic starting mechanism shall have started the engine.

Although but one embodiment of the invention has been shown and described in detail, it will be understood that other embodiments are possible and that various changes may be made in the precise details and arrangements of the parts without departing from the spirit of the invention as defined in the claims appended hereto.

What is claimed is:—

1. In combination with an internal combustion engine, a load clutch therefor, means operated by engine intake vacuum for disengaging said clutch, automatic starting mechanism for said engine, and means operative in case of engine stall to ensure actuation of the automatic starting mechanism prior to engagement of said clutch.

2. In combination with an internal combustion engine, a load clutch therefor, means operated by engine intake vacuum for disengaging said clutch, automatic starting mechanism for said engine including means for preventing actuation of the starting mechanism until the engine comes completely to rest, and means operative in case of engine stall to insure actuation of the automatic starting mechanism prior to engagement of said clutch due to the failure of the intake vacuum.

3. In combination with an internal combustion engine, a load clutch therefor, means under the control of the operator actuated by self-operation of the engine for controlling said clutch, and means operative in case of engine stall to restart said engine prior to the automatic engagement of said clutch.

4. In combination with an internal combustion engine, a load clutch therefor, fluid pressure means actuated by self-operation of the engine for controlling said clutch, means automatically operative in case of engine stall to restart said engine, means for delaying actuation of said automatic starting mechanism until the engine comes completely to rest, and means for delaying closure of said clutch responsive to engine stall to ensure actuation of the automatic starting mechanism prior thereto.

5. In combination with an internal combustion engine and automatic starting mechanism therefor including means for restarting in case of engine stall; a load clutch and an automatic control therefor including fluid pressure servo means responsive to self-operation of the engine for disengaging said clutch, a manual control device for said servo means, and means preventing immediate automatic closure of said clutch by reason of engine stall.

6. In combination with an internal combustion engine and automatic starting mechanism therefor including means for restarting in case of engine stall; a load clutch and an automatic control therefor including fluid pressure servo means responsive to self-operation of the engine for disengaging said clutch and means for maintaining the fluid pressure in said servo means irrespective of engine stall.

7. In combination with an internal combustion engine and automatic starting mechanism therefor including means for restarting in case of engine stall; a load clutch and an automatic control therefor including fluid pressure servo means responsive to self-operation of the engine for disengaging said clutch, a manual control device for said servo means and a check valve located between said manual control device and the engine arranged to prevent immediate loss of fluid pressure upon engine stall.

8. In combination with an internal combustion engine, a load clutch therefor, means under the control of the operator responsive to self-operation of the engine for disengaging said clutch, means for automatically restarting said engine in case of engine stall, adjustable means for delaying actuation of the automatic starting mechanism for a predetermined time after the engine has come substantially to rest, and means for delaying closure of said clutch due to engine stall to insure actuation of the automatic starting mechanism prior thereto.

WILLIAM L. McGRATH.